(12) United States Patent
Baek (10) Patent No.: US 12,282,401 B2
(45) Date of Patent: Apr. 22, 2025

(54) CONTROLLER, STORAGE DEVICE AND TEST SYSTEM

(71) Applicant: SK hynix Inc., Icheon-si (KR)

(72) Inventor: Seung Hwa Baek, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 29 days.

(21) Appl. No.: 18/318,655

(22) Filed: May 16, 2023

(65) Prior Publication Data

US 2024/0248823 A1    Jul. 25, 2024

(30) Foreign Application Priority Data

Jan. 20, 2023    (KR) .................. 10-2023-0008424

(51) Int. Cl.
| | | |
|---|---|---|
| *G06F 11/263* | (2006.01) | |
| *G06F 11/07* | (2006.01) | |
| *G06F 11/14* | (2006.01) | |
| *G06F 11/27* | (2006.01) | |
| *G06F 12/00* | (2006.01) | |
| *G06F 12/02* | (2006.01) | |
| *G06F 12/0831* | (2016.01) | |
| *G06F 13/16* | (2006.01) | |
| *G06F 15/78* | (2006.01) | |

(52) U.S. Cl.
CPC ........ *G06F 11/2635* (2013.01); *G06F 11/073* (2013.01); *G06F 11/141* (2013.01); *G06F 11/27* (2013.01); *G06F 12/00* (2013.01); *G06F 12/0238* (2013.01); *G06F 12/0835* (2013.01); *G06F 13/1668* (2013.01); *G06F 15/7839* (2013.01)

(58) Field of Classification Search
CPC .... G06F 11/2635; G06F 11/27; G06F 11/073; G06F 11/141; G06F 12/00; G06F 12/0238; G06F 12/0835; G06F 13/1668; G06F 15/7839
USPC .................. 714/719, 718, 720; 365/200, 201
See application file for complete search history.

(56) References Cited

U.S. PATENT DOCUMENTS

| | | | |
|---|---|---|---|
| 9,224,423 B1 * | 12/2015 | Seo ..................... | G11B 20/1217 |
| 10,720,177 B1 * | 7/2020 | Ng .......................... | G11B 5/012 |
| 2017/0075824 A1 * | 3/2017 | Haen ...................... | G06F 12/00 |
| 2018/0314467 A1 * | 11/2018 | Hwang .................. | G06F 3/0608 |
| 2019/0012228 A1 * | 1/2019 | Hsiao ..................... | G06F 11/076 |
| 2019/0304546 A1 * | 10/2019 | Hsiao ..................... | G06F 13/1668 |
| 2020/0042440 A1 * | 2/2020 | Hsiao ..................... | G06F 3/0679 |
| 2020/0042441 A1 * | 2/2020 | Hsiao ..................... | G06F 3/0608 |
| 2022/0405012 A1 * | 12/2022 | Sreedhar ................ | G06F 3/0613 |
| 2023/0061338 A1 * | 3/2023 | Veluswamy ......... | G06F 12/0246 |
| 2023/0297505 A1 * | 9/2023 | Hong .................. | G06F 12/0802 |
| 2024/0134696 A1 * | 4/2024 | Moshe .................. | G06F 9/5027 |
| 2024/0248823 A1 * | 7/2024 | Baek ...................... | G06F 11/27 |

FOREIGN PATENT DOCUMENTS

| | | |
|---|---|---|
| KR | 10-1911059 B1 | 4/2013 |
| KR | 10-2021-0011251 A | 2/2021 |

* cited by examiner

*Primary Examiner* — John J Tabone, Jr.

(57) ABSTRACT

A storage device operates in host mode or device mode, and the storage device operating in host mode may transmit and receive various information units with the storage device operating in device mode to perform tests on the storage device operating in device mode, thereby performing the test of a storage device in development.

19 Claims, 10 Drawing Sheets

CONTROLLER, STORAGE DEVICE AND TEST SYSTEM

CROSS-REFERENCE TO RELATED APPLICATION

The present application claims priority under 35 U.S.C. § 119(a) to Korean patent application number 10-2023-0008424 filed on Jan. 20, 2023 in the Korean Intellectual Property Office, which is incorporated herein by reference in its entirety.

TECHNICAL FIELD

Embodiments of the present disclosure relate to a controller, a storage device and a test system.

BACKGROUND

A storage device may include a memory including a plurality of memory cells. In addition, the storage device may include a controller for controlling an operation of the memory. This storage device may have a standard-compliant structure, and a controller may be designed to operate in accordance with the standard-compliant structure.

A standard for a storage device may be updated, and a storage device may be developed according to the updated standard. Accordingly, there is required a method for testing the performance of a storage device being developed according to a new standard.

SUMMARY

Embodiments of the disclosure may provide a configuration capable of testing the performance of storage devices being developed as the standards for storage devices are updated.

In one aspect, embodiments of the disclosure may provide a test system including a first storage device including a first buffer memory, and a first processor configured to create and store a command unit in the first buffer memory and to transmit the command unit to the outside and configured to read and process a response unit received from the outside and stored in the first buffer memory, and a second storage device including a second buffer memory, and a second processor configured to read and process the command unit received from the outside and stored in the second buffer memory and configured to create and store the response unit corresponding to the command unit in the second buffer memory and to transmit the response unit to the outside.

In another aspect, embodiments of the disclosure may provide a controller including a buffer memory, and a processor that operates in host mode or device mode and that is configured to create and store a first command unit in the buffer memory and control the first command unit to be transmitted to the outside in the host mode, and read and process a second command unit received from the outside and stored in the buffer memory in the device mode.

In another aspect, embodiments of the disclosure may provide a storage device including a memory including a plurality of memory cells, and a controller for controlling an operation of the memory, wherein the controller includes a buffer memory, and a processor operating in host mode or device mode and configured to, in the host mode, create and store a first command unit in the buffer memory and control the first command unit to be transmitted to the outside, or reads and processes a first response unit received from the outside and stored in the buffer memory.

According to embodiment of the present disclosure, it is possible to provide a configuration capable of easily testing the normal operation and performance of storage devices developed according to new standards.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Figure 1:
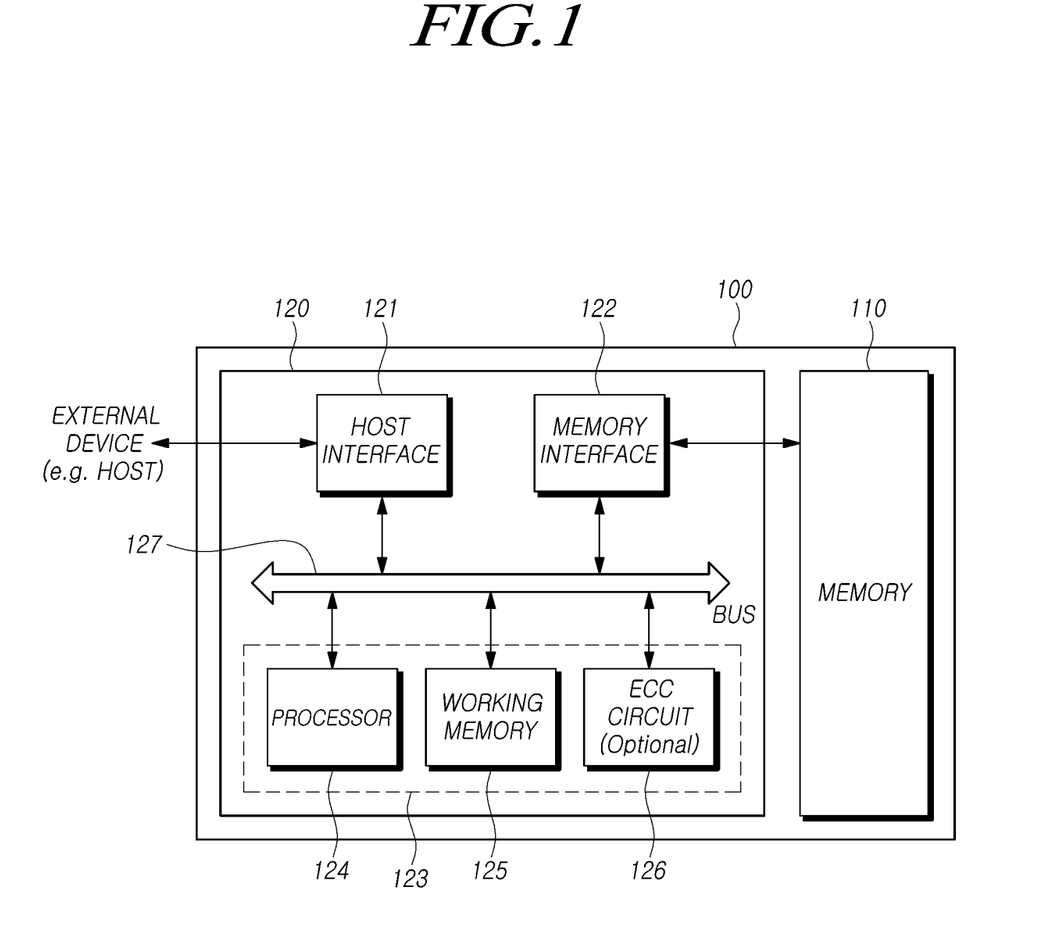
FIG. 1 is a schematic diagram illustrating a configuration of a storage device according to embodiments of the present disclosure.

FIG. 1 is a schematic diagram illustrating a configuration of a storage device according to embodiments of the present disclosure.

Referring to FIG. 1, a storage device 100 according to example embodiments may include a memory 110 for storing data and a controller 120 for controlling the memory 110.

The memory 110 may include a plurality of memory blocks and may operate in response to control of the controller 120. The operation of the memory 110 may include, for example, a read operation, a program operation (also referred to as a write operation), and an erase operation.

The memory 110 may include a memory cell array including a plurality of memory cells (also referred to simply as "cells") storing data. Such a memory cell array may exist in a memory block.

For example, the memory 110 may be implemented in a variety of types of a NAND flash memory, a 3D NAND flash memory, a NOR flash memory, a resistive RAM, a phase change memory, a magneto-resistive memory, a ferroelectric memory, or a spin injection magnetization inversion memory.

Meanwhile, the memory 110 may be implemented in a three-dimensional array structure. Embodiments of the present disclosure may be applied not only to a flash memory in which a charge storage layer is composed of a conductive floating gate, but also to a flash memory of a charge trap type in which a charge storage layer is composed of an insulating film.

The memory 110 may receive a command and an address from the controller 120 and access an area selected by the address in the memory cell array. The memory 110 may perform an operation indicated by a command on an area selected by an address.

For example, the memory 110 may perform a program operation, a read operation, and an erase operation.

When performing a program operation, the memory 110 may program data in an area selected by an address. When performing a read operation, the memory 110 may read data from an area selected by an address. When performing the erase operation, the memory 110 may erase data stored in an area selected by an address.

The controller 120 may control write (program), read, erase, and background operations of the memory 110. The background operations may include, for example, one or more of garbage collection (GC), wear leveling (WL), read reclaim (RR), or bad block management (BBM) operations.

The controller 120 may control the operation of the memory 110 according to a request of an external device (e.g., a host HOST) located outside the storage device 100. In addition, the controller 120 may control the operation of the memory 110 regardless of a request from the host HOST.

The host may be a computer, UMPC (Ultra Mobile PC), workstation, PDA (Personal Digital Assistants), tablet, mobile phone, smartphone, e-book, PMP (Portable Multimedia Player), portable game device, a navigation device, a black box, a digital camera, a DMB (Digital Multimedia Broadcasting) players, smart televisions, digital voice recorders, digital voice players, digital video recorders, digital video players, digital video recorders, digital video players, storage constituting data centers, one of various electronic devices constituting a home network, one of various electronic devices constituting a computer network, one of various electronic devices constituting a telematics network, an REID (Radio Frequency IDentification) device, and a mobile device (e.g., a vehicle, a robot, a drone) capable of driving under human control or autonomous driving.

The host may include at least one operating system. The operating system may manage and control overall functions and operations of the host and provide mutual operations between the host and the storage device 100. The operating system may be divided into a general operating system and a mobile operating system depending on the mobility of the host.

The controller 120 and the host may be separate devices. In some cases, the controller 120 and the host may be implemented as an integrated device. In the following, for convenience of explanation, it will be described an example in which the controller 120 and the host are separate devices.

Referring to FIG. 1, the controller 120 may include a memory interface 122, a control circuit 123, and the like, and may further include a host interface 121.

The host interface 121 provides an interface for communication with the host. For example, the host interface 121 may provide an interface using at least one of an universal serial bus (USB) protocol, a multimedia card (MMC) protocol, a peripheral component interconnection (PCI) protocol, a PCI-express (PCI-E) protocol, and an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, and a private protocol.

When receiving a command from the host, the control circuit 123 may receive the command through the host interface 121 and perform an operation of processing the received command.

The memory interface 122 may be connected to the memory 110 to provide an interface for communication with the memory 110.

The memory interface 122 may be configured to provide an interface between the memory 110 and the controller 120 in response to control of the control circuit 123.

The control circuit 123 may control the operation of the memory 110 by performing overall control operations of the controller 120. For example, the control circuit 123 may include one or more of a processor 124, a working memory 125, and the like, and may optionally include an error detection and correction circuit (ECC Circuit, 126) and the like.

The processor 124 may control overall operations of the controller 120 and perform logical operations. The processor 124 may communicate with the host through the host interface 121 and may communicate with the memory 110 through the memory interface 122.

The processor 124 may perform a function of a flash translation layer (FTL). The processor 124 may convert a logical block address (LBA) provided by the host into a physical block address (PBA) through a flash translation layer (FTL). The flash translation layer (FTL) may receive a logical block address (LBA) by using a mapping table and convert it into a physical block address (PBA).

There are various methods of address mapping of the flash translation layer according to mapping units. The address mapping methods may include a page mapping method, a block mapping method, and a mixed mapping method.

The processor 124 may randomize data received from the host. For example, the processor 124 may randomize data received from the host using a set randomizing seed. The randomized data may be provided to the memory 110 and programmed into a memory cell array of the memory 110.

The processor 124 may derandomize data received from the memory 110 during a read operation. For example, the processor 124 may derandomize data received from the memory 110 using the derandomizing seed. The derandomized data may be output to the host.

The processor 124 may control the operation of the controller 120 by executing firmware. The processor 124 may execute (drive) firmware loaded into the working memory 125 during booting in order to control the overall operation of the controller 120 and perform logical operations. Hereinafter, an operation of the storage device 100 described in embodiments of the present disclosure may be implemented in a manner in which the processor 124 executes firmware defining corresponding operations.

The firmware may be a program executed in the storage device 100 to drive the storage device 100, and may include various functional layers. For example, the firmware may include binary data defining codes for executing each of the aforementioned functional layers.

For example, the firmware may include at least one of a flash translation layer (FTL) for performing a conversion function between a logical address requested by the host to the storage device 100 and a physical address of the memory 110; a host interface layer (HIL) for interpreting a command requested by the host to the storage device 100 and delivering it to a flash translation layer (FTL); and a flash interface layer (FIL) for transferring commands instructed by the flash translation layer (FTL) to the memory 110.

Such firmware, for example, may be loaded into the working memory 125 from the memory 110 or from a separate memory (e.g., ROM, NOR Flash) located outside the memory 110. When executing a booting operation after power-on, the processor 124 may first load all or part of the firmware into the working memory 125.

The processor 124 may perform logic operations defined in firmware loaded in the working memory 125 to control the overall operation of the controller 120. The processor 124 may store a result of performing a logic operation defined in firmware in the working memory 125. The processor 124 may control the controller 120 to create a command or signal according to a result of performing a logic operation defined in firmware. If the part of the firmware defining the logic operation to be performed is not loaded in the working memory 125, then an event may be created (e.g., an interrupt) for loading the corresponding part of the firmware into the working memory 125.

Meanwhile, the processor 124 may load meta data necessary for driving the firmware from the memory 110. Meta data is data for managing the memory 110 and may include management information about user data stored in the memory 110.

The firmware may be updated while the storage device 100 is being produced or while the storage device 100 is running. The controller 120 may download new firmware from the outside of the storage device 100 and update the existing firmware to the new firmware.

The working memory 125 may store firmware, program codes, commands, or data required to operate the controller 120. The working memory 125, as a volatile memory, may include, for example, one or more of static RAM (SRAM), dynamic RAM (DRAM), and synchronous DRAM (SDRAM).

The error detection and correction circuit 126 may detect an error bit of target data using an error correction code and correct the detected error bit. The target data may be, for example, data stored in the working memory 125 or data read from the memory 110.

The error detection and correction circuit 126 may be implemented to decode data with an error correction code. The error detection and correction circuit 126 may be implemented with a variety of code decoders. For example, a decoder performing non-systematic code decoding or a decoder performing systematic code decoding may be used.

For example, the error detection and correction circuit 126 may detect an error bit in units of sectors set for each of the read data. Each read data may be composed of a plurality of sectors. A sector may refer to a data unit smaller than a page, which is a read unit of a flash memory. Sectors constituting each read data may correspond to each other by using an address.

The error detection and correction circuit 126 may calculate a bit error rate (BER) and determine the possibility of correction in units of sectors. For example, the error detection and correction circuit 126 may determine that the corresponding sector is uncorrectable or failed if the bit error rate is higher than a set reference value. On the other hand, if the bit error rate is lower than the reference value, then the corresponding sector may be determined to be correctable or pass.

The error detection and correction circuit 126 may sequentially perform error detection and correction operations on all read data. If a sector included in read data is correctable, then the error detection and correction circuit 126 may skip an error detection and correction operation for a corresponding sector for next read data. If the error detection and correction operations for all read data are completed in this way, then the error detection and correction circuit 126 may detect sectors determined to be uncorrectable until the end. The number of sectors determined to be uncorrectable may be one or more. The error detection and correction circuit 126 may transfer information (e.g., address information) on a sector determined to be uncorrectable to the processor 124.

A bus 127 may be configured to provide a channel between components 121, 122, 124, 125, and 126 of controller 120. The bus 127 may include, for example, a control bus for transferring various control signals, commands, and the like, and a data bus for transferring various data.

Meanwhile, some of the above-described components 121, 122, 124, 125, and 126 of the controller 120 may be deleted, or some of the above-described components 121, 122, 124, 125 and 126 may be integrated into one element. In some cases, one or more other components may be added in addition to the above-described components of the controller 120.

The memory 110 and the controller 120 of the storage device 100 may be implemented and operated according to standards. If standards are updated, then the storage device 100 is required to be developed according to the updated standards. While the storage device 100 is being developed, there may be also developed a host that transmits commands or data to the storage device 100, so it may be difficult to test the storage device 100.

Embodiments of the present disclosure provide a method for performing a test of the storage device 100 under development by providing a method for allowing the storage device 100 to operate in a host mode and a device mode.

FIGS. 2 to 5 illustrate examples of methods in which a storage device operates in a host mode and a device mode and processes a command unit and a response unit according to embodiments of the present disclosure.

Figure 2:
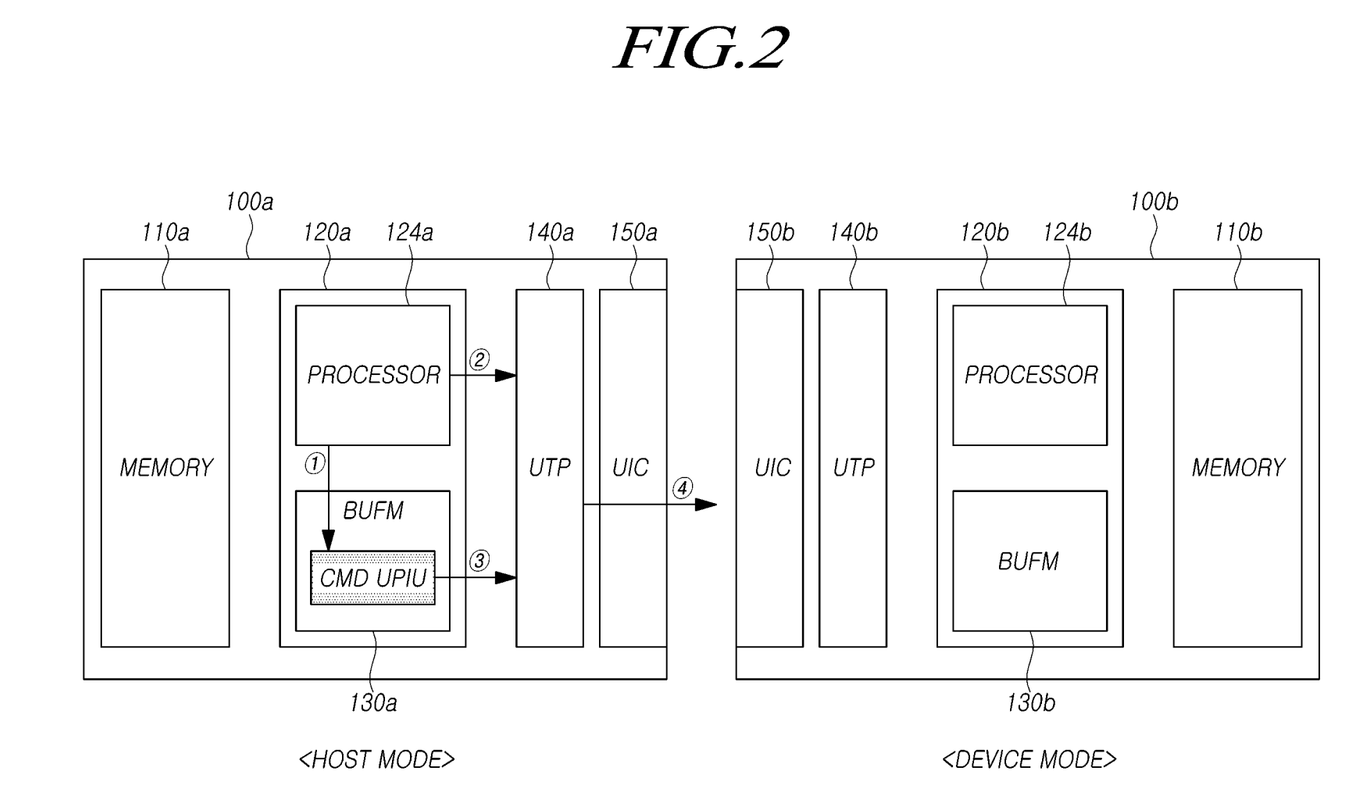
FIGS. 2 to 5 illustrate examples of methods in which a storage device operates in a host mode and a device mode and processes a command unit and a response unit according to embodiments of the present disclosure.

Referring to FIG. 2, a storage device 100 according to embodiments may operate in a host mode and a device mode. The storage device 100 may operate in the host mode or the device mode by, for example, firmware.

FIG. 2 illustrates an example in which a first storage device 100a operates in a host mode and a second storage device 100b operates in a device mode. The first storage device 100a operates in a host mode, and there may be performed a test of the second storage device 100b operating in the device mode.

In this disclosure, a system including a first storage device 100a operating in a host mode and a second storage device 100b operating in a device mode may be referred to as a test system.

The first storage device 100a may include a first memory 110a, a first controller 120a, a first transmission protocol layer 140a, and a first connection layer 150a. The first controller 120a may include a first processor 124a and a first buffer memory 130a. The first buffer memory 130a may be the working memory 125 of FIG. 1, but is not limited thereto. In some cases, the first buffer memory 130a may be a volatile memory located inside the first storage device 100a but outside the first controller 120a.

The first storage device 100a may operate in a host mode by firmware executed by the first processor 124a. The first transmission protocol layer 140a and the first connection layer 150a may be hardware components for transmitting data to the outside or receiving data from the outside.

The second storage device 100b may include a second memory 110b, a second controller 120b, a second transmission protocol layer 140b, and a second connection layer 150b. The second controller 120b may include a second processor 124b and a second buffer memory 130b.

The second storage device 100b may operate in a device mode by firmware executed by the second processor 124b.

The second buffer memory 130b, the second transmission protocol layer 140b, and the second connection layer 150b of the second storage device 100b may correspond to each of a first buffer memory 130a, the first transmission protocol layer 140a, and the first connection layer 150a, respectively. Components included in the second storage device 100b may perform different operations from components included in the first storage device 100a according to operation modes.

Since the first storage device 100a operates in the host mode, the first storage device 100a may create and transmit a command unit CMD UPIU to the second storage device 100b. In this specification, the command unit CMD UPIU created by the first storage device 100a in the host mode may be referred to as a "first command unit".

The first processor 124a of the first storage device 100a may create a command unit CMD UPIU for testing the second storage device 100b and store the command unit CMD UPIU in the first buffer memory 130a. (①).

The first processor 124a may notify the first transmission protocol layer 140a that the command unit CMD UPIU is stored in the first buffer memory 130a and is ready to be transmitted (②).

If the first transmission protocol layer 140a recognizes that the transmission preparation of the command unit (CMD UPIU) is completed by the first processor 124a, then the first transmission protocol layer 140a may receive the command unit CMD UPIU stored in the first buffer memory 130a (③) and transmit the command unit CMD UPIU to the second storage device 100b through the first connection layer 150a (④).

When the command unit CMD UPIU is transmitted by the first storage device 100a operating in the host mode, the second storage device 100b operating in the device mode may perform an operation of processing the received command unit CMD UPIU.

Figure 3:
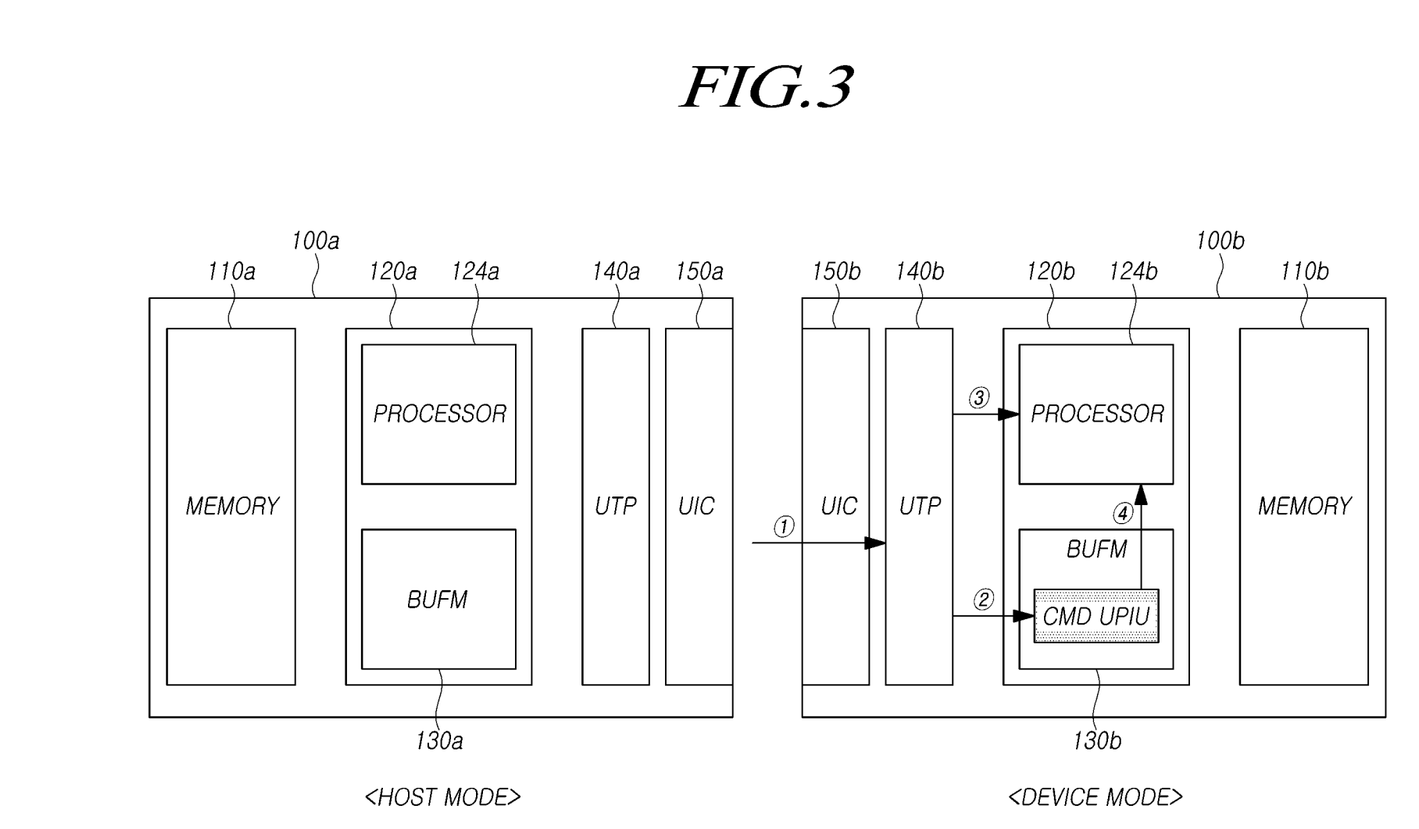

For example, referring to FIG. 3, the second transmission protocol layer 140b of the second storage device 100b may receive the command unit CMD UPIU transmitted by the first storage device 100a through the second connection layer 150b (①). In this disclosure, the command unit CMD UPIU processed by the second storage device 100b operating in the device mode may be referred to as a "second command unit".

The second transmission protocol layer 140b may store the received command unit CMD UPIU in the second buffer memory 130b (②). The second transmission protocol layer 140b may inform the second processor 124b of receiving the command unit CMD UPIU (③).

The second processor 124b, upon receiving information regarding the reception of the command unit CMD UPIU from the second transmission protocol layer 140b, may process the command unit CMD UPIU by reading the command unit CMD UPIU stored in the second buffer memory 130b and executing an operation according to the command unit CMD UPIU (④).

The second storage device 100b, in response to the command unit CMD UPIU received from the outside or in response to the operation of the first storage device 100a operating in the host mode, may perform an operation of creating a response unit RESP UPIU and transmitting the response unit RESP UPIU to the outside.

Figure 4:
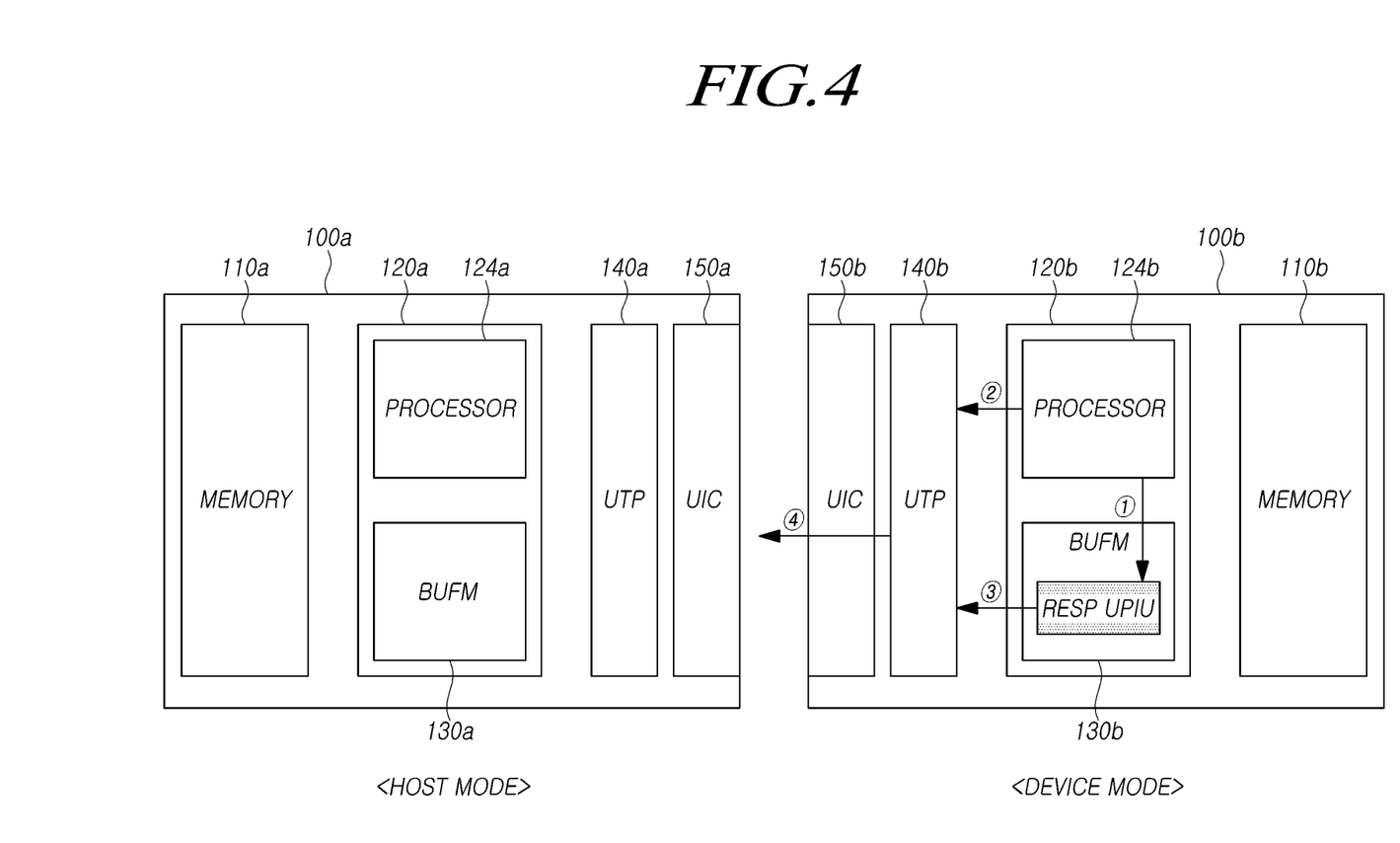

For example, referring to FIG. 4, the second storage device 100b may operate in a device mode, and may create the response unit RESP UPIU and store the created response unit RESP UPIU in the second buffer memory 130b (①). In this disclosure, the response unit RESP UPIU created by the second storage device 100b operating in the device mode may be referred to as a "second response unit".

If the response unit RESP UPIU is created and stored in the second buffer memory 130b, then the second processor 124b may notify the second transmission protocol layer 140b that the response unit RESP UPIU is stored in the second buffer memory 130b (②).

If the second transmission protocol layer 140b recognizes that the response unit RESP UPIU is stored in the second buffer memory 130b by the second processor 124b, the second transmission protocol layer 140b may receive the response unit RESP UPIU stored in the second buffer memory 130b (③), and transmit the response unit RESP UPIU to the first storage device 100a operating in the host mode through the second connection layer 150b (④).

A method of creating and transmitting the response unit RESP UPIU by the second storage device 100b operating in the device mode may be similar to a method in which the first storage device 100a operating in the host mode creates and transmits the command unit CMD UPIU.

The first storage device 100a operating in the host mode may process the response unit RESP UPIU transmitted by the second storage device 100b operating in the device mode.

Figure 5:
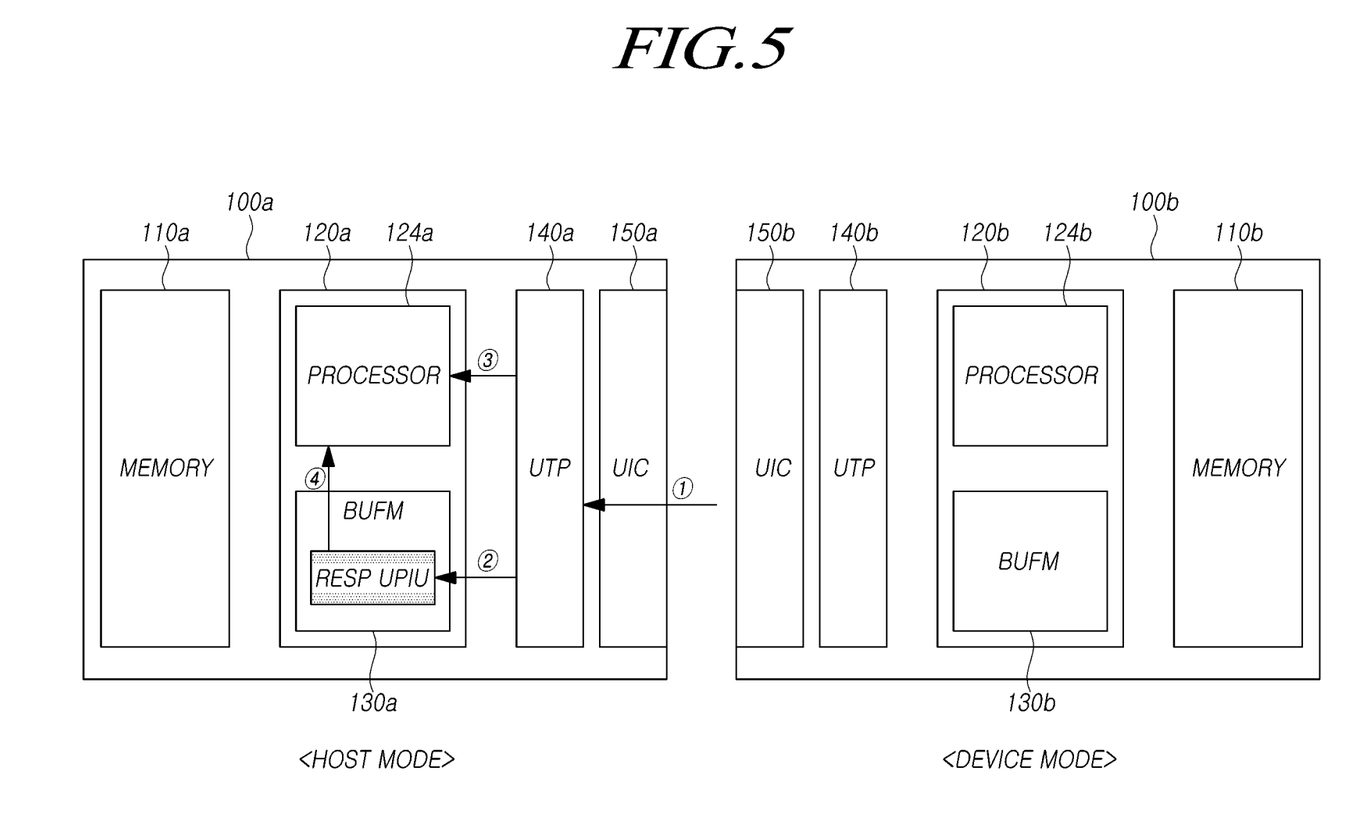

For example, referring to FIG. 5, the first transmission protocol layer 140a of the first storage device 100a may receive the response unit RESP UPIU through the first connection layer 150a (①). In this disclosure, the response unit RESP UPIU received and processed by the first storage device 100a operating in the host mode may be referred to as a "first response unit".

The first transmission protocol layer 140a may store the received response unit RESP UPIU in the first buffer memory 130a (②).

The first transmission protocol layer 140a may store the response unit RESP UPIU in the first buffer memory 130a, and notify the first processor 124a that the response unit RESP UPIU is stored in the first buffer memory 130a (③).

The first processor 124a may read the response unit RESP UPIU stored in the first buffer memory 130a and process the response unit RESP UPIU (④).

A method of receiving and processing the response unit RESP UPIU by the first storage device 100a operating in the host mode may similar to a method of receiving and processing the command unit CMD UPIU by the second storage device 100b operating in the device mode.

Since the first storage device 100a operating in the host mode transmits the command unit CMD UPIU to the outside or processes the response unit RESP UPIU received from the outside, there may be performed a test of the second storage device 100b operating in the device mode.

In addition to the above example, a task management request unit (Task Management Request UPIU) or a query request unit (Query Request UPIU) similar to the command unit CMD UPIU may also be processed in a manner similar to that of the command unit CMD UPIU. In addition, the task management response unit (Task Management Response UPIU) or the query response unit (Query Response UPIU) may be processed in a manner similar to that of the response unit RESP UPIU.

In addition, other types of information units created and transmitted by the host HOST similar to the command unit CMD UPIU may be created by the first storage device 100a operating in the host mode and transmitted to the outside. Further, another type of information unit received and processed by the host HOST from the outside similar to the response unit RESP UPIU may be received and processed by the first storage device 100a operating in the host mode.

As described above, it is possible to perform a test of the second storage device 100b, which is being developed according to updated standards and operates in the device mode. The test may be performed by the first storage device 100a operating in the host mode.

In addition, the first storage device 100a operating in the host mode may transmit and receive data with the second storage device 100b operating in the device mode based on the command unit CMD UPIU. There may be performed various tests by using data transmitted and received between the first storage device 100a and the second storage device 100b.

Figure 6:
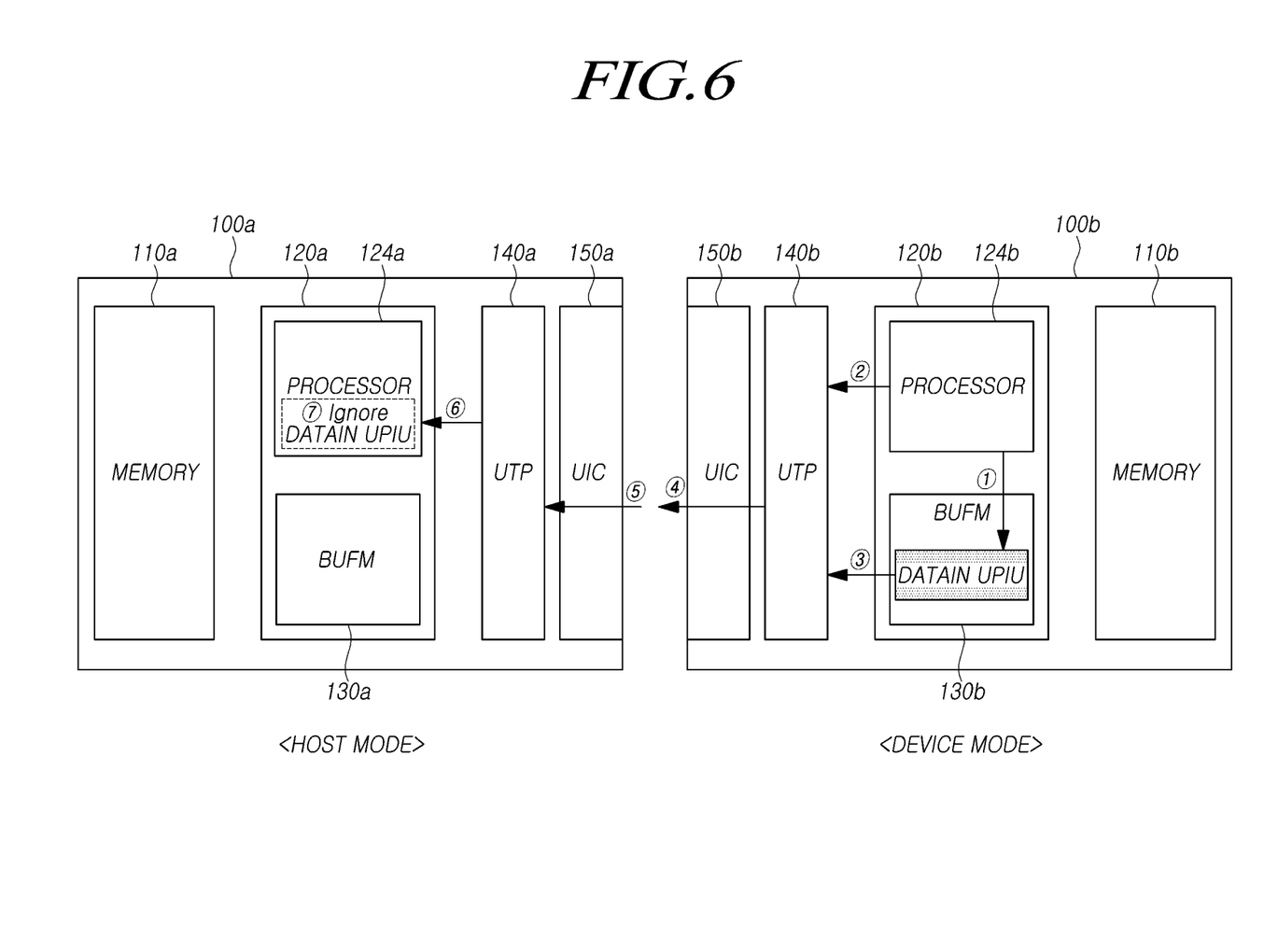
FIG. 6 illustrates an example of a method of processing a test input data unit in a host mode and a device mode by a storage device according to embodiments of the present disclosure.

FIG. 6 illustrates an example of a method of processing a test input data unit in a host mode and a device mode by a storage device according to embodiments of the present disclosure.

Referring to FIG. 6, a second storage device 100b operating in device mode may create and transmit a test input data unit DATAIN UPIU according to a command unit CMD UPIU transmitted by a first storage device 100a operating in host mode.

For example, the first storage device 100a may transmit a read command to the second storage device 100b by the command unit CMD UPIU. The second storage device 100b may create and transmit, to the first storage device 100a, the test input data unit DATAIN UPIU according to the command unit CMD UPIU.

The second processor 124b of the second storage device 100b may create and store the test input data unit DATAIN UPIU in the second buffer memory 130b (①). The second processor 124b may notify the second transmission protocol layer 140b that the test input data unit DATAIN UPIU is stored in the second buffer memory 130b (②).

The second transmission protocol layer 140b, upon receiving information about the test input data unit DATAIN UPIU stored in the second buffer memory 130b, may receive the test input data unit DATAIN UPIU from the second buffer memory 130b (③) and transmit the test input data unit DATAIN UPIU to the first storage device 100a through the second connection layer 150b (④).

A method of creating and transmitting the test input data unit DATAIN UPIU by the second storage device 100b may be similar to a method of creating and transmitting the response unit RESP UPIU by the second storage device 100b. In addition, a method in which the second storage device 100b creates and transmits the test input data unit DATAIN UPIU may be similar to a method of creating and transmitting the command unit CMD UPIU by the first storage device 100a.

The first storage device 100a may process the test input data unit DATAIN UPIU transmitted by the second storage device 100b.

The first transmission protocol layer 140a of the first storage device 100a may receive the test input data unit DATAIN UPIU through the first connection layer 150a (⑤).

The first transmission protocol layer 140a may notify the first processor 124a of the reception of the test input data unit DATAIN UPIU (⑥).

The first processor 124a may confirm the reception of the test input data unit DATAIN UPIU and then discard the test input data unit DATAIN UPIU (⑦).

The first storage device 100a operates in a host mode, and may perform a test by discarding the test input data unit DATAIN UPIU received from the second storage device 100b without storing the test input data unit DATAIN UPIU.

For example, the first processor 124a of the first storage device 100a may discard the test input data unit DATAIN UPIU transmitted by the second storage device 100b without checking the test input data unit DATAIN UPIU.

Alternatively, the first processor 124a may check the size of the test input data unit DATAIN UPIU without checking a header or payload of the test input data unit DATAIN UPIU, and then may discard the test input data unit DATAIN UPIU.

Alternatively, in some cases, the first processor 124a may check at least one of a header and a payload of the test input data unit DATAIN UPIU.

When the first processor 124a checks at least one of a header and a payload of the test input data unit DATAIN UPIU, the first processor 124*a* may store all or part of the test input data unit DATAIN UPIU in the first buffer memory 130*a*. For example, the first processor 124*a* may store only the header of the test input data unit DATAIN UPIU in the first buffer memory 130*a*.

As described above, the first storage device 100*a* operating in the host mode may process the test input data unit DATAIN UPIU received from the second storage device 100*b* in various ways according to the test type.

A method of processing the test input data unit DATAIN UPIU by the first storage device 100*a* may be distinguished by, for example, a test identifier.

Figure 7:
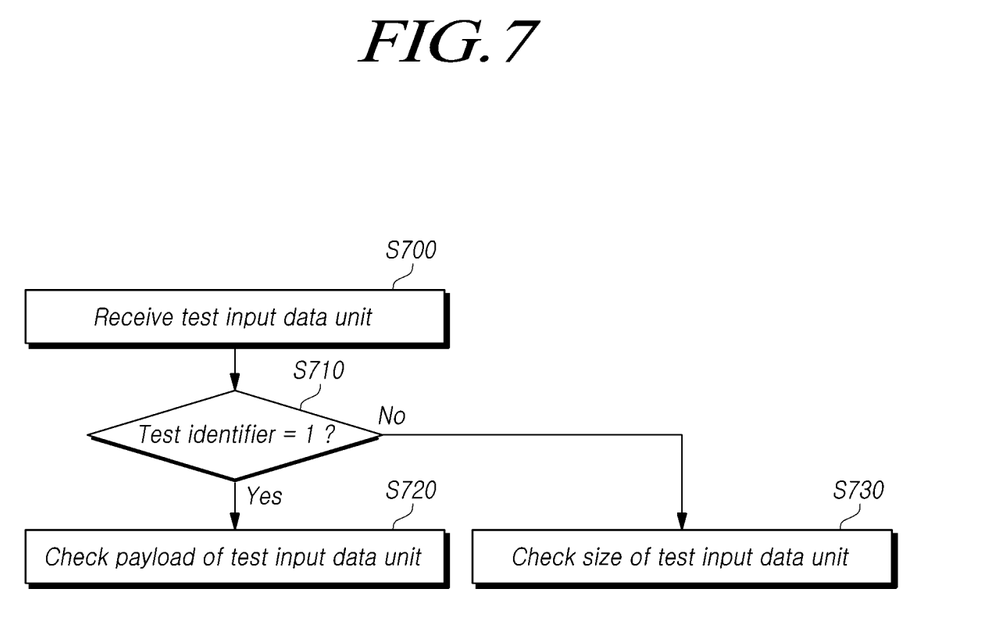
FIG. 7 illustrates an example of a process in which a storage device in a host mode performs a test using a test input data unit according to embodiments of the present disclosure.

FIG. 7 illustrates an example of a process in which a storage device in a host mode performs a test using a test input data unit according to embodiments of the present disclosure.

Referring to FIG. 7, a first storage device 100*a* operating in a host mode may receive a test input data unit DATAIN UPIU from a second storage device 100*b* operating in a device mode (S700).

The first processor 124*a* of the first storage device 100*a* may check a test identifier (S710).

The test identifier may be, for example, information transmitted by the first storage device 100*a* operating in the host mode. The test identifier may be, for example, information transmitted through an initiator ID IID, but the transmitted information is not limited thereto.

For example, if the test identifier is "1" (S710), then the first processor 124*a* may perform a test to determine whether the second storage device 100*b* operating in the device mode is operating normally. The first processor 124*a* may check a payload of the test input data unit DATAIN UPIU (S720).

The first processor 124*a* may check whether the payload of the test input data unit DATAIN UPIU is information corresponding to a read command transmitted by the first processor 124*a*, and determine whether the second storage device 100*b* is normally operating.

In this case, the test input data unit DATAIN UPIU may be stored in the first buffer memory 130*a* and then read and processed by the first processor 124*a*.

If the test identifier is not "1" (S710), then the first processor 124*a* may perform a test to check the performance of the second storage device 100*b* operating in the device mode. The first processor 124*a* may check a size of the test input data unit DATAIN UPIU (S730).

For example, the first processor 124*a* may check whether received test input data unit DATAIN UPIU has a size corresponding to the command unit CMD UPIU transmitted to the second storage device 100*b*.

In this example, the first processor 124*a* may check only the size of the test input data unit DATAIN UPIU and discard the test input data unit DATAIN UPIU. Alternatively, the first processor 124*a* may store only the header of the test input data unit DATAIN UPU in the first buffer memory 130*a* not discarding all of the test input data unit DATAIN UPIU. And the first processor 124*a* may check information of the header of the test input data unit DATAIN UPIU so as to check performance of the second storage device 100*b* operating in the device mode.

The first processor 124*a* may process the test input data unit DATAIN UPIU differently according to the test identifier, and may perform a test for normal operation or performance of the second storage device 100*b* operating in the device mode.

As described above, the first processor 124*a* of the first storage device 100*a* may receive the test input data unit DATAIN UPIU from the second storage device 100*b* according to the read command and perform a test of the second storage device 100*b*.

In addition, when the command unit CMD UPIU transmitted to the second storage device 100*b* is a write command, the first processor 124*a* may perform an operation according to the write command and test the second storage device 100*b*.

Figure 8:
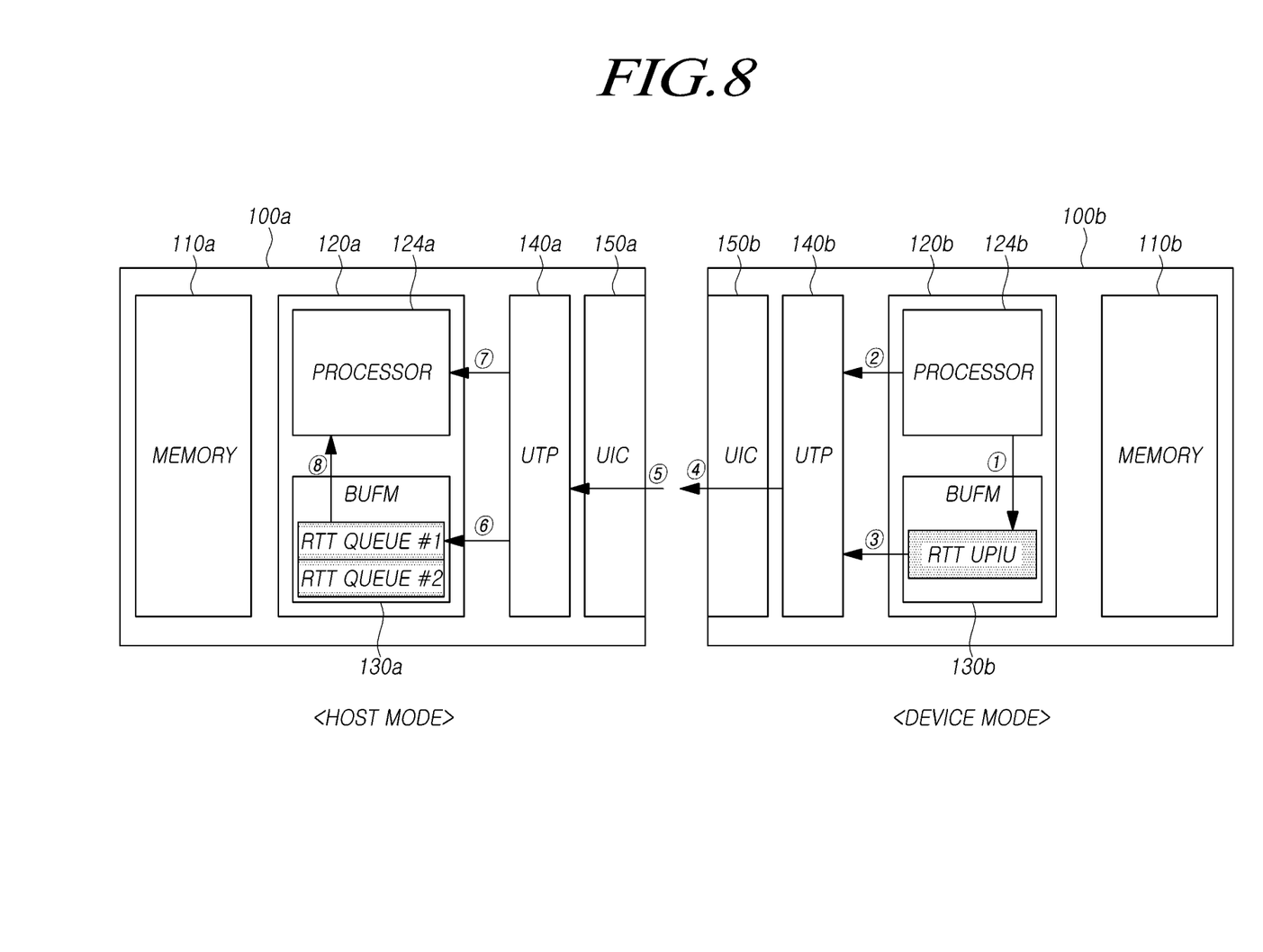
FIGS. 8 and 9 illustrate examples of methods of processing a test output data unit in a host mode and a device mode by a storage device according to embodiments of the present disclosure.
Figure 9:
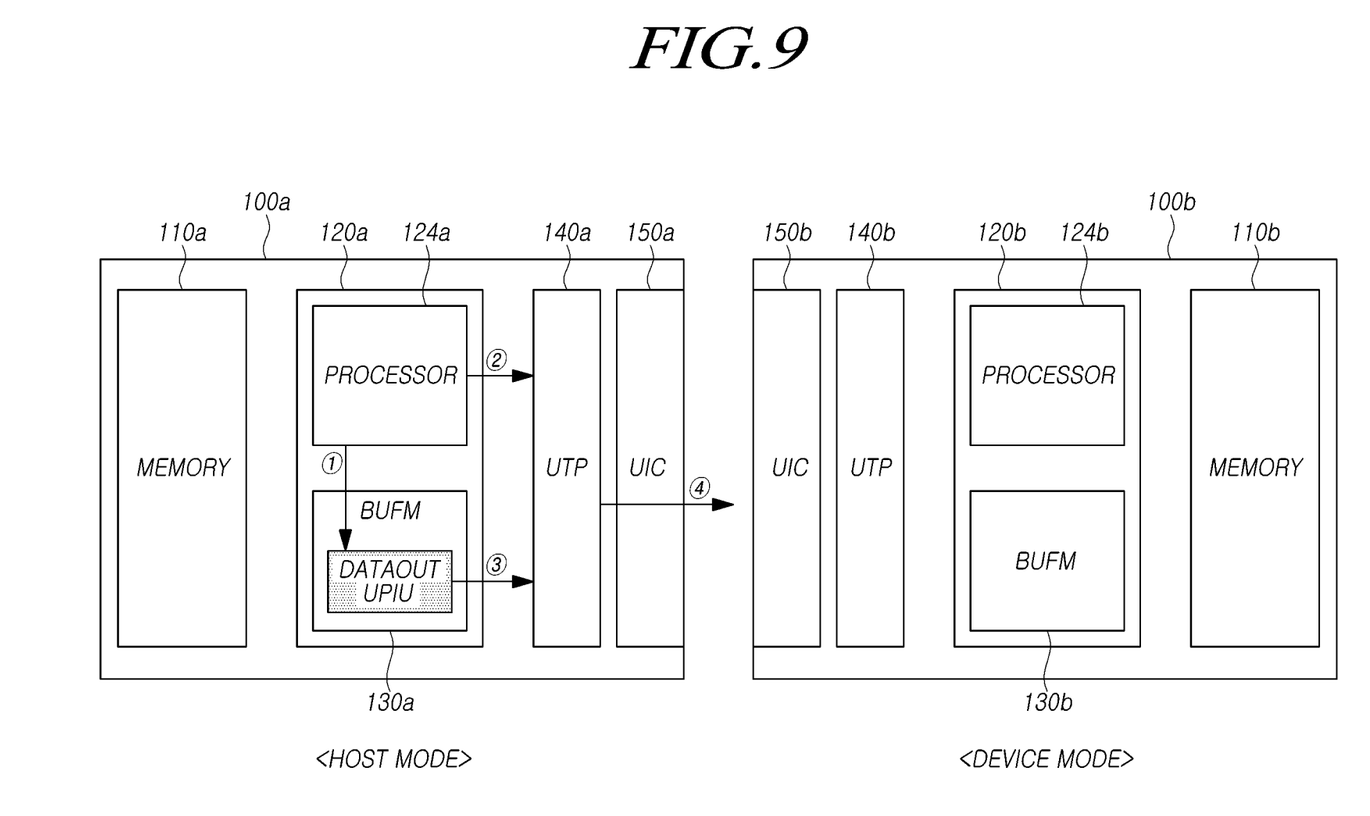

FIGS. 8 and 9 illustrate examples of a method of processing a test output data unit in a host mode and a device mode by a storage device according to embodiments of the present disclosure.

Referring to FIG. 8, in response to a command unit CMD UPIU transmitted by a first processor 124*a* of a first storage device 100*a* operating in a host mode, a second storage device operating in the device mode may create and transmit a transmission preparation signal RTT UPIU.

For example, the second processor 124*b* of the second storage device 100*b* may create the transmission preparation signal RTT UPIU when ready to write data to the second memory 110*b* in response to a write command received from the first storage device 100*a*. The second processor 124*b* may create and store the transmission preparation signal RTT UPIU in the second buffer memory 130*b* (①).

The second processor 124*b* may inform the second transmission protocol layer 140*b* of storing the transmission preparation signal RTT UPIU in the second buffer memory 130*b* (②).

The second transmission protocol layer 140*b* may receive the transmission preparation signal RTT UPIU stored in the second buffer memory 130*b* (③) and transmit the transmission preparation signal RTT UPIU to the first storage device 100*a* through the second connection layer 150*b* (④).

The first transmission protocol layer 140*a* of the first storage device 100*a* may receive the transmission preparation signal RTT UPIU through the first connection layer 150*a* (⑤).

The first transmission protocol layer 140*a* may store the transmission preparation signal RTT UPIU in the first buffer memory 130*a* (⑥). The transmission preparation signal RTT UPIU may be queued in the first buffer memory 130*a* according to order received.

The first transmission protocol layer 140*a* may notify the first processor 124*a* that the transmission preparation signal RTT UPIU has been received (⑦)

The first processor 124*a* may read the transmission preparation signal RTT UPIU stored in the first buffer memory 130*a* and perform processing according to the transmission preparation signal RTT UPIU (⑧).

The first processor 124*a* may create and transmit a test output data unit DATAOUT UPIU to the second storage device 100*b* according to the transmission preparation signal RTT UPIU.

For example, referring to FIG. 9, the first processor 124*a* may create a test output data unit DATAOUT UPIU according to the transmission preparation signal RTT UPIU and store the test output data unit DATAOUT UPIU in the first buffer memory 130*a* (①).

The first processor 124*a* may inform the first transmission protocol layer 140*a* that the test output data unit DATAOUT UPIU is stored in the first buffer memory 130*a* (②).

The first transmission protocol layer 140*a* may receive the test output data unit DATAOUT UPIU stored in the first buffer memory 130*a* (③), and transmit the test output data unit DATAOUT UPIU to the second storage device 100*b* through the first connection layer 150*a* (④).

A method of creating and transmitting the test output data unit DATAOUT UPIU by the first processor 124a may be similar to a method of creating and transmitting the command unit CMD UPIU.

The first processor 124a may create the test output data unit DATAOUT UPIU in various ways according to the type of test to be performed.

For example, the first processor 124a may check the transmission preparation signal RTT UPIU, and create and transmit the test output data unit DATAOUT UPIU corresponding to the transmission preparation signal RTT UPIU in a manner similar to the method of transmitting the command unit CMD UPIU.

Alternatively, the first processor 124a may create the test output data unit DATAOUT UPIU according to the size of the preset information unit. For example, the first processor 124a may create the test output data unit DATAOUT UPIU according to a specific pattern or a randomly selected pattern.

For example, the first processor 124a may create a header of the test output data unit DATAOUT UPIU to match the header of the transmission preparation signal RTT UPIU. The first processor 124a may create the test output data unit DATAOUT UPIU including the created header and the pattern described above.

Depending on the type of test performed on the second storage device 100b, the first processor 124a may transmit the test output data unit DATAOUT UPIU corresponding to the transmission preparation signal RTT UPIU or may transmit the test output data unit DATAOUT UPIU having a specific size and including a specific pattern or random pattern.

A method of creating the test output data unit DATAOUT UPIU by the first processor 124a may be distinguished by a test identifier.

Figure 10:
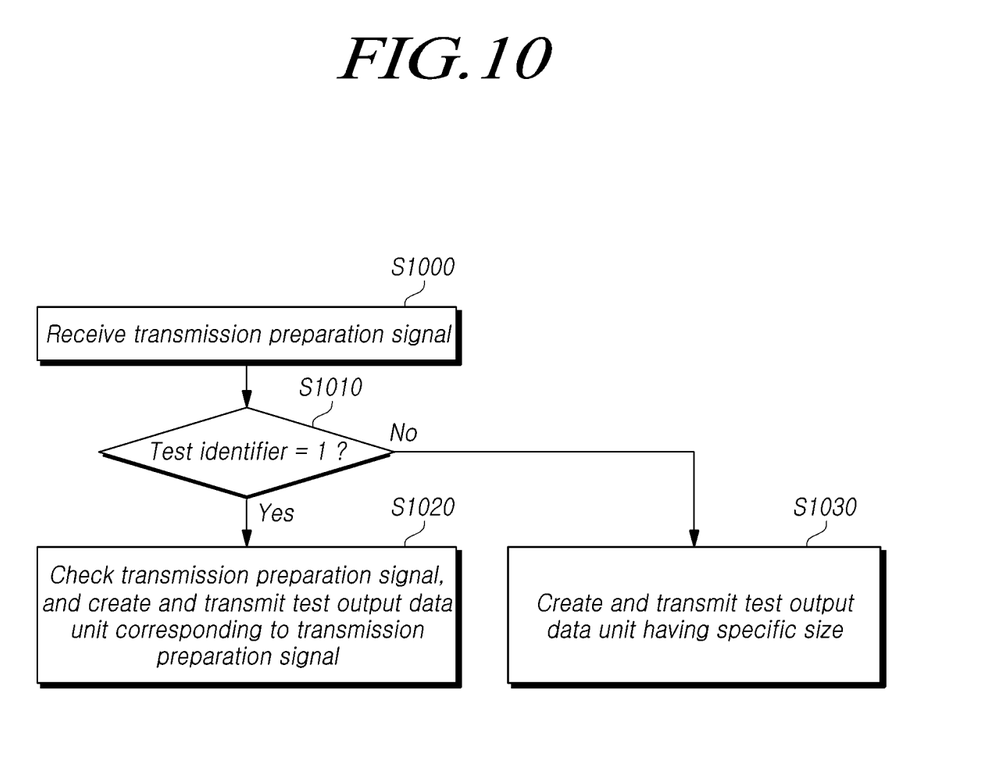
FIG. 10 illustrates an example of a process in which a storage device performs a test using a test output data unit in a host mode according to embodiments of the present disclosure.

FIG. 10 illustrates an example of a process in which a storage device performs a test using a test output data unit in a host mode according to embodiments of the present disclosure.

Referring to FIG. 10, a first storage device 100a operating in host mode may receive a transmission preparation signal RTT UPIU from a second storage device 100b operating in device mode (S1000).

The first processor 124a of the first storage device 100a may check a test identifier (S1010).

The test identifier may be, for example, information transmitted by the first storage device 100a operating in the host mode, and may be information transmitted through an initiator ID IID, but the transmitted information is not limited thereto.

If the test identifier is "1" (S1010), then the first processor 124a may check the received transmission preparation signal RTT UPIU, create a test output data unit DATAOUT UPIU corresponding to the transmission preparation signal RTT UPIU, and transmit the test output data unit DATAOUT UPIU to the second storage device 100b (S1020).

By checking the transmission preparation signal RTT UPIU received from the second storage device 100b, it may be determined whether the second storage device 100b is normally operating.

If the test identifier is not "1" (S1010), then the first processor 124a may create and transmit a test output data unit having a specific size to the second storage device 100b (S1030).

For example, the first processor 124a may check a header of the received transmission preparation signal RTT UPIU. The first processor 124a may create a header of the test output data unit DATAOUT UPIU according to the header of the transmission preparation signal RTT UPIU. The first processor 124a may create and transmit a test output data unit DATAOUT UPIU having a preset size and including a specific pattern or a randomly selected pattern as a payload.

The first processor 124a may create and transmit the test output data unit DATAOUT UPIU created in a specific pattern and a specific size according to the transmission preparation signal RTT UPIU received from the second storage device 100b, and may perform a test for the performance of the second storage device 100b. For example, the first processor 124a may randomly transmit the test output data unit DATAOUT UPIU, and may test the performance of the second storage device 100b based on the speed or frequency of the transmission preparation signal RTT UPIU received from the second storage device 100b.

According to the above-described embodiments of the present disclosure, since the storage device 100 operates in a host mode and a device mode, a storage device 100 being developed according to a specific standard may communicate with a storage device 100 designed according to the same standard and perform a test of the storage device 100.

In addition, since a test of the storage device 100 can be performed before implementing a host corresponding to the storage device 100 under development, it is possible to facilitate a development of the storage device 100 and improve the stability of the storage device 100 being developed according to updated standards.

Based on embodiments of the disclosed technology described above, the operation delay time of the memory system may be advantageously reduced or minimized. In addition, based on embodiments of the disclosed technology, an overhead occurring in the process of calling a specific function may be advantageously reduced or minimized.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A test system device comprising:
    a first storage device, operating in a host mode, including a first buffer memory and a first processor configured to create and store a command unit to test performance of a second storage device in the first buffer memory and to transmit the command unit to the second storage device, and configured to read and process a test input data unit received from the second storage device and stored in the first buffer memory; and
    the second storage device, operating in a device mode, including a second buffer memory and a second processor configured to read and process the command unit received from the first storage device and stored in the second buffer memory and configured to create and store the test input data unit corresponding to the command unit in the second buffer memory and to transmit the test input data unit to the first storage device,
    wherein the first storage device processes the test input data unit to check the performance of the second storage device.

2. The test system of claim 1, wherein, when receiving the test input data unit corresponding to the command unit which is transmitted from the first storage device, the first storage device stores a header and a payload of the test input data unit in the first buffer memory and checks the payload of the test input data unit.

3. The test system of claim 1, wherein, when receiving the test input data unit corresponding to the command unit which is transmitted from the first storage device, the first storage device checks a size of the test input data unit.

4. The test system of claim 3, wherein the first storage device discards the test input data unit.

5. The test system of claim 3, wherein the first storage device stores a header of the test input data unit in the first buffer memory.

6. The test system of claim 1, wherein, when receiving a transmission preparation signal corresponding to the command unit which is transmitted from the first storage device, the first storage device stores the transmission preparation signal in the first buffer memory and checks the transmission preparation signal, and creates a test output data unit corresponding to the transmission preparation signal and transmits the test output data unit to the second storage device.

7. The test system of claim 1, wherein, when receiving a transmission preparation signal corresponding to the command unit which is transmitted from the first storage device, the first storage device creates a test output data unit of a specific size corresponding to a header of the transmission preparation signal and transmits the test output data unit to the second storage device.

8. The test system of claim 7, wherein the test output data unit includes a preset pattern or a randomly selected pattern.

9. The test system of claim 1, wherein the first storage device checks a payload or a size of the test input data unit according to a test identifier.

10. The test system of claim 1, wherein the first storage device creates a test output data unit corresponding to a transmission preparation signal according to a test identifier or creates a test output data unit having a specific size and including a preset pattern or a randomly selected pattern.

11. The test system of claim 1, wherein the first buffer memory and the second buffer memory are volatile memories, and each of the first storage device and the second storage device further comprises a non-volatile memory.

12. A controller comprising:
a buffer memory; and
a processor of a first storage device that operates in host mode or device mode and that is configured to, in the host mode, create and store a first command unit to test performance of a second storage device in the buffer memory and control the first command unit to be transmitted to a controller in the second storage device operating in the device mode,
wherein, in the device mode, the processor of the first storage device reads and processes a test input data unit, received from the controller in the second storage device operating in the host mode, and stored in the buffer memory of the first storage device in the device mode.

13. The controller of claim 12, wherein the processor of the first storage device in the host mode reads and processes the test input data unit, received from the second storage device operating in the device mode and stored in the buffer memory of the first storage device in the host mode, and,
wherein the processor of the first storage device operating in the device mode creates and stores a second response unit corresponding to the test input data unit in the buffer memory and controls the second response unit to be transmitted to the controller of the second storage device which is operating in the host mode.

14. The controller of claim 12, wherein the processor of the first storage device in the host mode checks a size of the test input data unit received from the controller of the second storage device which is operating in the device mode in response to the first command unit and discards the test input data unit in the host mode.

15. The controller of claim 12, wherein the processor of the first storage device in the host mode receives a transmission preparation signal from the controller of the second storage device which is operating in the device mode in response to the first command unit, creates a test output data unit of a specific size, and controls the test output data unit to be transmitted to the controller of the second storage device which is operating in the device mode.

16. A storage device comprising:
a memory including a plurality of memory cells; and
a controller for controlling an operation of the memory, wherein the controller comprises;
a buffer memory, and
a processor operating in host mode or device mode and configured to, in the host mode, create and store a first command unit to test performance of another storage device in the buffer memory and control the first command unit to be transmitted to the another storage device operating in the device mode, or read and process a first test input data unit received from the another storage device operating in the device mode and stored in the buffer memory.

17. The storage device of claim 16, wherein the processor, in the device mode, reads and processes a second command unit received from the another storage device which is operating in the host mode and stored in the buffer memory, or creates and stores a second test input data unit corresponding to the second command unit in the buffer memory and controls the second test input data unit to be transmitted to the another storage device operating in the host mode.

18. The storage device of claim 16, wherein the processor in the host mode checks a payload or a size of the first test input data unit according to a test identifier.

19. The storage device of claim 16, wherein the processor, in the host mode, creates a test output data unit corresponding to a transmission preparation signal according to a test identifier or creates a test output data unit having a specific size and including a preset pattern or a randomly selected pattern.

* * * * *